US012691615B2

(12) United States Patent
Lambæk

(10) Patent No.: US 12,691,615 B2
(45) Date of Patent: Jul. 28, 2026

(54) GUIDE RAIL SYSTEM FOR MOLD BOX

(71) Applicant: LEGO A/S, Billund (DK)

(72) Inventor: Jens Stamp Lambæk, Billund (DK)

(73) Assignee: LEGO A/S, Billund (DK)

( * ) Notice: Subject to any disclaimer, the term of this patent is extended or adjusted under 35 U.S.C. 154(b) by 757 days.

(21) Appl. No.: 17/796,982

(22) PCT Filed: Feb. 8, 2021

(86) PCT No.: PCT/EP2021/052924
§ 371 (c)(1),
(2) Date: Aug. 2, 2022

(87) PCT Pub. No.: WO2021/156501
PCT Pub. Date: Aug. 12, 2021

(65) Prior Publication Data
US 2023/0057834 A1      Feb. 23, 2023

(30) Foreign Application Priority Data

Feb. 6, 2020    (DK) .................................. 202070075

(51) Int. Cl.
| | |
|---|---|
| *B29C 45/26* | (2006.01) |
| *B29C 33/30* | (2006.01) |
| *B29C 45/17* | (2006.01) |
| *F16C 29/02* | (2006.01) |

(52) U.S. Cl.
CPC ........ *B29C 45/1761* (2013.01); *B29C 33/303* (2013.01); *F16C 29/02* (2013.01)

(58) Field of Classification Search
CPC ......... B29C 45/03; B29C 45/04; B29C 45/14; B29C 45/14467; B29C 45/1761; B29C 45/2701; B29C 45/322; B29C 45/40; B29C 45/401; B29C 45/44; B29C 45/2606

See application file for complete search history.

(56) References Cited

U.S. PATENT DOCUMENTS

| | | | |
|---|---|---|---|
| 3,389,625 | A | 6/1968 | Wagner |
| 4,515,415 | A | 5/1985 | Szenger |
| 4,718,845 | A | 1/1988 | Sheffield et al. |
| 4,750,876 | A | 6/1988 | Lawson |
| 4,884,962 | A | 12/1989 | Sheffield |
| 4,941,758 | A | 7/1990 | Osawa |

(Continued)

FOREIGN PATENT DOCUMENTS

| | | |
|---|---|---|
| CN | 1678441 A | 10/2005 |
| CN | 101309789 A | 11/2008 |

(Continued)

OTHER PUBLICATIONS

CN Office Action corresponding to U.S. Appl. No. 17/796,987, dated Sep. 14, 2023, 8 pages (translation unavailable).

(Continued)

*Primary Examiner* — Thu Khanh T. Nguyen
(74) *Attorney, Agent, or Firm* — DAY PITNEY LLP; George N. Chaclas; Anthony A. Kassas

(57) ABSTRACT

A mold box having a first mold plate and a second mold plate. The mold box includes a single elongate guide rail extending through a bore defined by the second mold plate. The single elongate guild rail allows the second mold plate to be movably arranged relative to the first mold plate.

20 Claims, 5 Drawing Sheets

(56)    References Cited

U.S. PATENT DOCUMENTS

| | | | |
|---|---|---|---|
| 5,360,332 | A | 11/1994 | Hehl |
| 5,547,367 | A | 8/1996 | Stein |
| 5,788,903 | A | 8/1998 | Allgaier |
| 6,203,312 | B1 | 3/2001 | Romi |
| 2003/0138513 | A1 | 7/2003 | Matsuura et al. |
| 2004/0013765 | A1 | 1/2004 | Kruger et al. |
| 2004/0076353 | A1 | 4/2004 | Kubota et al. |
| 2006/0233474 | A1 | 10/2006 | Naruse et al. |
| 2007/0172539 | A1 | 7/2007 | Wang et al. |
| 2007/0210534 | A1 | 9/2007 | Thibault et al. |
| 2009/0130244 | A1 | 5/2009 | Clarke |
| 2009/0220631 | A1 | 9/2009 | Bokich |
| 2010/0001436 | A1 | 1/2010 | Axelsson |
| 2011/0254396 | A1 | 10/2011 | Evans |
| 2012/0269917 | A1 | 10/2012 | Miyatake et al. |
| 2014/0106022 | A1 | 4/2014 | Navarra |
| 2014/0175690 | A1 | 6/2014 | Sudermann |
| 2018/0043594 | A1 * | 2/2018 | Cho ........................ B29C 45/14 |

FOREIGN PATENT DOCUMENTS

| | | | |
|---|---|---|---|
| CN | 202498707 U | 10/2012 | |
| CN | 202985844 U | 6/2013 | |
| CN | 203937071 U | 11/2014 | |
| CN | 104246252 A | 12/2014 | |
| CN | 104512008 A | 4/2015 | |
| CN | 104526997 A | 4/2015 | |
| CN | 105196479 A | 12/2015 | |
| CN | 108099141 A | 6/2018 | |
| CN | 109312778 A | 2/2019 | |
| CN | 109352904 A | 2/2019 | |
| CN | 109822845 A | 5/2019 | |
| CN | 110267719 A | 9/2019 | |
| DE | 3924182 C1 | 5/1990 | |
| DE | 29614378 U1 | 11/1996 | |
| DE | 19627176 A1 | 1/1998 | |
| DE | 29802231 U1 | 4/1998 | |
| DE | 19952142 A1 | 5/2000 | |
| DE | 202004012169 U1 | 8/2005 | |
| DE | 102005030700 B3 * | 1/2007 | ......... B29C 45/2602 |
| DE | 102006046528 A | 4/2008 | |
| DE | 102006046528 A1 | 4/2008 | |
| DE | 102011075324 A1 | 11/2012 | |
| DE | 102011080452 A1 | 2/2013 | |
| DE | 202018107023 U1 | 3/2020 | |
| EP | 0687541 A1 | 12/1995 | |
| EP | 0856391 A1 | 8/1998 | |
| EP | 1468807 A1 | 10/2004 | |
| EP | 2607044 A2 | 6/2013 | |
| FR | 2952576 A1 | 5/2011 | |
| GB | 578318 A | 6/1946 | |
| GB | 837640 A | 6/1960 | |
| GB | 2030847 A1 | 4/1980 | |
| GB | 2283936 A1 | 5/1995 | |
| JP | 8543155 A | 1/1979 | |
| JP | H03239807 A | 10/1991 | |
| JP | H0524067 A | 2/1993 | |
| JP | H0646925 U | 6/1994 | |
| JP | H07156232 A | 6/1995 | |
| JP | H07246622 A2 | 9/1995 | |
| JP | H08281746 A | 10/1996 | |
| JP | H1058491 A | 3/1998 | |
| JP | H10305465 A | 11/1998 | |
| JP | 2002192561 A | 7/2002 | |
| JP | 2002-321222 A2 | 11/2002 | |
| JP | 2006327131 A | 12/2006 | |
| JP | 2007130940 A | 5/2007 | |
| JP | 2010038349 A2 | 2/2010 | |
| JP | 2010111014 A | 5/2010 | |
| JP | 2011-245829 A | 12/2011 | |
| JP | 2013193396 A | 9/2013 | |
| JP | 2014134231 A2 | 7/2014 | |
| JP | 2018030269 A2 | 3/2018 | |
| KR | 19990025827 A | 4/1999 | |
| KR | 20070039781 A | 4/2007 | |
| WO | 2007039767 A1 | 4/2007 | |
| WO | 2007063375 A1 | 6/2007 | |

OTHER PUBLICATIONS

JP Office Action corresponding to Application No. 2022-533529, dated Sep. 10, 2024, 5 pages (Machine Translation).

CN Notice of Allowance corresponding to U.S. Appl. No. 17/796,987, dated Oct. 17, 2023, 5 pages.

International Preliminary Report on Patentability corresponding to Application No. PCT/EP2021/052924, mailed Apr. 12, 2022, 32 pages.

International Search Report in corresponding Application No. PCT/EP2021/052924, mailed May 11, 2021, 2 pages.

DK Search Report in Application No. PA 2020 70076, dated Jan. 2019, 4 pages.

DK Search Report in Application No. PA 2020 70463, dated Jan. 2019, 4 pages.

DK Search Report in Application No. PA 2020 70075, dated Jan. 2019, 4 pages.

International Search Report in corresponding Application No. PCT/EP2021/052922, mailed May 11, 2021, 3 pages.

CN Office Action corresponding to U.S. Appl. No. 17/796,982, dated Oct. 11, 2023, 8 pages (translation unavailable).

CN Search Report corresponding to Application No. 2021800477752, dated Mar. 7, 2026, 3 pages.

\* cited by examiner

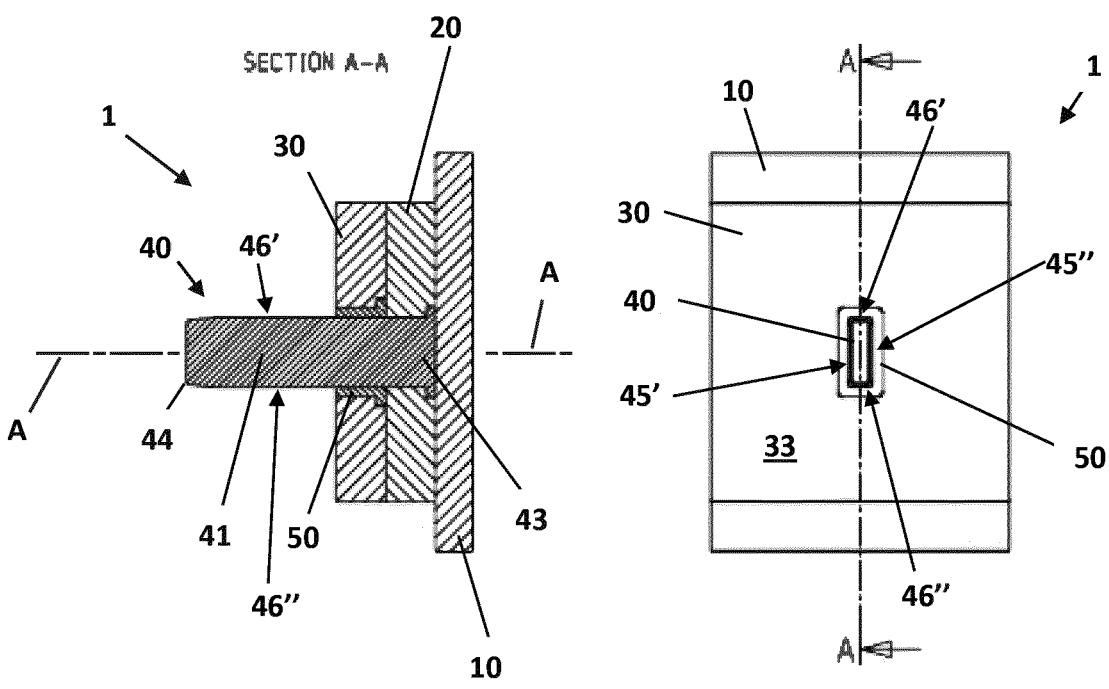
Fig. 3C
Fig. 3B
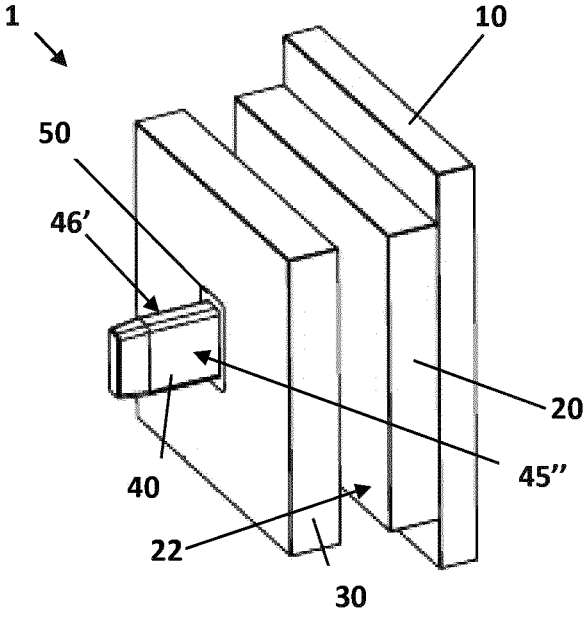
Fig. 4A

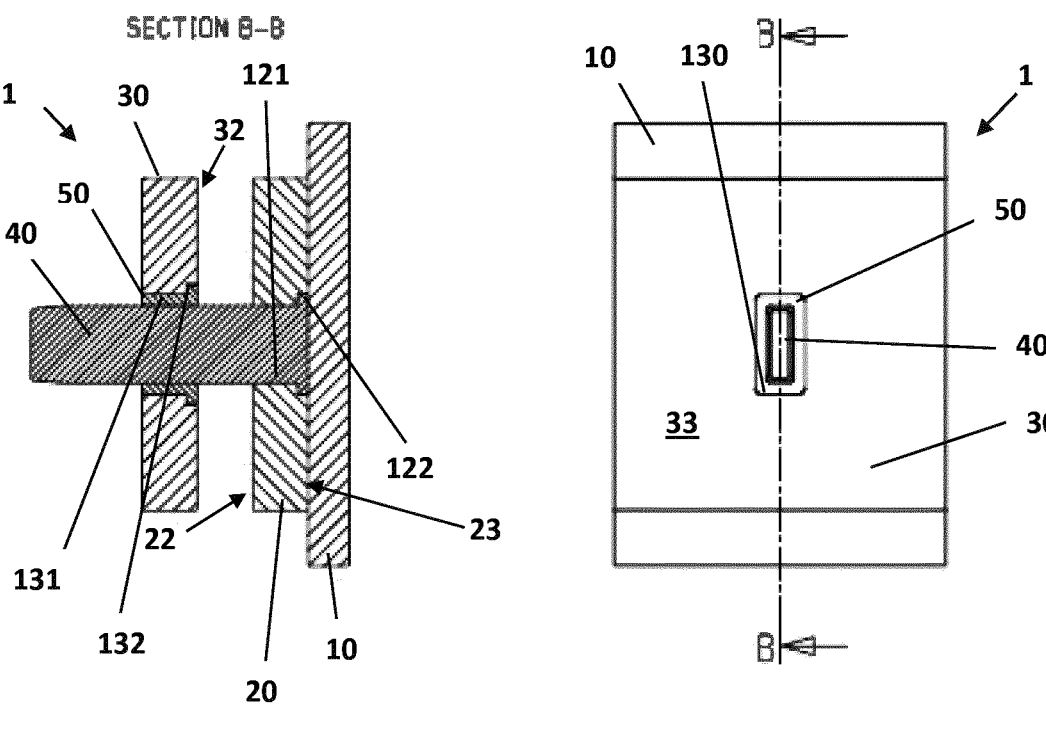
Fig. 4C
Fig. 4B
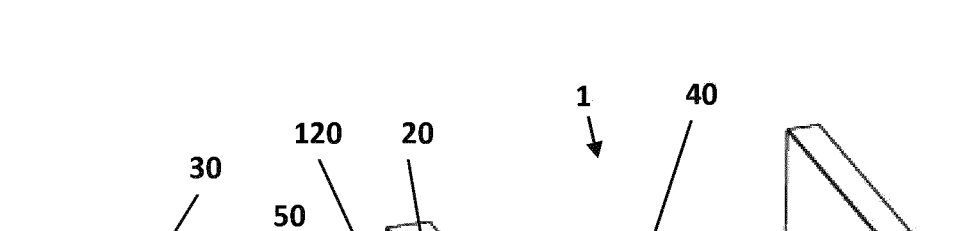
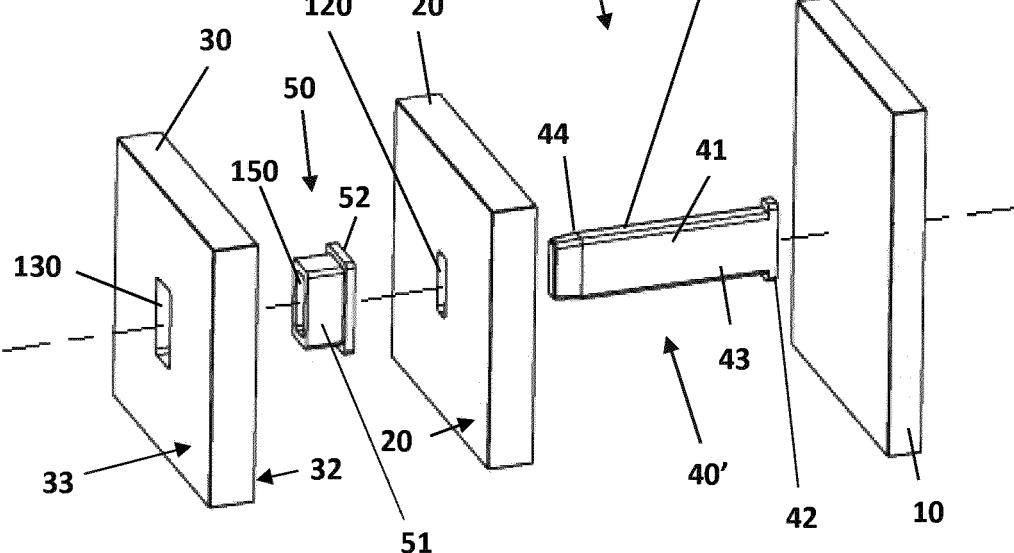
Fig. 5

GUIDE RAIL SYSTEM FOR MOLD BOX

CROSS-REFERENCE TO RELATED APPLICATIONS

The present application claims priority to Danish Patent Application No, PA202070075 dated Feb. 6, 2020, and is a U.S. National Stage Application under 35 U.S.C. 371 of co-pending international Application No. PCT/EP2021/052924 filed on Feb. 8, 2021, the contents of each are incorporated by reference herein in their entirety for all purposes.

FIELD OF THE DISCLOSURE

The present disclosure relates to main guide rails, and more particularly to guide rails for mold boxes for injection molding machines used in injection molding processes.

BACKGROUND

In the field of injection molding, machines having an injection unit and a clamping unit for operating a mold box. the mold box typically comprises two mold plates arranged moveably relative to each other and guided by a set of main guide rails. The clamping unit further comprises a linear drive mechanism for pressing at least one of the mold plates against one or more other mold plates, during injection of molten plastic performed by the injection unit. The main guide rails are configured for supporting the mold plates, while the linear drive mechanism presses the plates together and when the mold plates are moved towards each other or away from each other.

Typically, one mold is fixed relative to a frame of the injection molding machine. In typical injection molding machines, one or more mold-plates is/are slideable along the set of main guide rails, which may also be referred to as main guide rail pillars. Four cylindrical main guide rail pillars are commonly arranged in parallel to each other, and intersecting the four corners of the mold plates. The linear drive mechanism drives the sliding of the at least one moveable mold plate along the set of main guide rail pillars, between a position, where the mold plates closes to form a mold, and a position, where the mold plates are separated from each other, so that a molded item may be removed from the mold box.

The use of a set of four cylindrical main guide rail pillars provides for making a very stable construction. It is however a disadvantage that such mold box constructions are very complicated and expensive to manufacture due to the high precision needed for making the mold plates slide on the set of parallel guide rails, driving tight tolerance demands. Further, during use mold boxes are subject to uneven temperature distribution, causing uneven wear on the mold box parts. It is also a problem that the guide rails makes it difficult to design for auxiliary functions for example ejection pins, extraction arms etc.

In the mold boxes of clamping unit of some injection molding machines, in order to secure correct alignment of the mold plates, when the mold plates are moved together, in addition to the main guide rail pillars, it is known to provide an additional alignment or positioning system. Such as system may comprise a conical protrusion extending from one mold plate and a complementary conical indention formed in the opposing mold plate. When the mold plates are mowed towards each other, the interacting conical surfaces will align the mold plates.

It is also known in the art, that such alignment systems comprises mating parts of other shapes.

CN 203937071 U discloses an alignment system where a central position cylinder having a star-shaped cross section is secured to one plate and has a free end which mates with a star shaped opening in another plate. Further, two rectangular positioning bars are placed on each side of the central position cylinder.

WO 2007/063375 A1 discloses an alignment system, where one an insert block attached to a mold plate has four alignment bars arranged along each side face of the insert block, the alignment bars having free ends extending toward an insert block attached to an opposite mold plate. This other insert block has four alignment channels complementary to the alignment bars, such that insert blocks may be aligned when they are moved towards one another.

US 2014/175690 A1 and JP 2002 321222 A discloses similar alignment systems to those disclosed in CN 203937071 U and WO 2007/063375 A1.

Common to these prior art injection molding machines, is that the alignment systems are additional to the main guide rail pillars of the clamping unit of the injection molding machines, and that these structured take up very much space on the surfaces of the mold plates, leaving reduced space for mold cavities and mold cores, etc.

SUMMARY

It is therefore an object of the present disclosure to solve the disadvantages of the prior art systems, and to increase the variety of options. It is a further object of the disclosure to provide a simpler clamping unit of an injection molding machine and a simpler mold box therefore. It is a further object of the disclosure to provide a clamping unit of an injection molding machine and a mold box therefore which provides a stable movement of mold plates, thereof. It is a further object of the disclosure to provide a clamping unit of an injection molding machine and a mold box therefore providing precise alignment of the mold plates thereof.

In a first aspect the objects of the disclosure are achieved by an injection molding machine comprising
  a frame;
  an injection unit attached to the frame;
  a clamping unit being attached to the frame; and
  a linear drive mechanism for moving a second mold plate
    of a mold box of the clamping unit.
wherein the clamping unit comprises
  a clamping unit frame;
  a base plate fixedly arranged at a first end of the clamping
    unit frame;
  a second end structure fixedly arranged at a second end of
    the clamping unit frame: and
  a mold box,
wherein the mold box comprises
  a first mold plate,
  said second mold plate movably arranged relative to the
    first mold plate; and
  a main guide rail system configured for guiding the
    second mold plate linearly away from and towards the
    first mold plate along a longitudinal axis,
  wherein the main guide rail system comprises a main
    guide rail pillar by the linear drive mechanism of the
    clamping unit,
  wherein the main guide rail system comprises only one
    main guide rail pillar,
  wherein the main guide rail pillar comprises a first end
    and a second end, the first end of the main guide rail pillar being fixedly connected to the base plate of the clamping unit, and the second end of the main guide rail pillar, being fixedly connected to the second end structure of the clamping unit, wherein the main guide rail pillar has a cross section perpendicular the longitudinal axis, and wherein the cross-section of the main guide rail pillar forms a polygon.

It has shown that the precision of alignment of the mold plates may be improved using main guide rail pillars having polygonal cross sectional shapes, and that these can replace the traditional cylindrical main guide rail pillars of prior art main guide rail systems. It has further shown, that the using main guide rail pillars having polygonal cross sectional shapes may replace or at least reduce the need for further alignment systems.

Further, the use of polygonal main guide rail pillars allows for simpler hearing constructions, which may reduce cost and wear. Further, the use of polygonal main guide rail pillars allows for reducing the number of main guide rail pillars.

In an embodiment, the cross-sectional shape of the main guide rail pillar is generally rectangular.

In a further embodiment, the rectangular shape of the main guide rail pillar is oriented such that a longer side of the rectangular shape extends vertically and a shorter side of the rectangular shape extends horizontally.

The main guide rail system comprises a single main guide rail pillar only. Thus, the main guide rail system has on and only one main guide rail pillar.

Despite the large forces acting on a mold box in use it has been discovered that a single guide rail may provide sufficient stability to support the injection molding process. By only one main guide rail pillar with a polygonal cross sectional shape it is possible to make a guiding function with no constrains, since only one set of guide surfaces secures the position, e.g. along an axis perpendicular to the longitudinal axis. Utilizing a single main guide rail pillar only allows better access to the volume between the mold plates of the open mold box for e.g. extraction of molded objects (e.g. via robot arms), maintenance, and for e.g. automated replacement of mold cavity/mold core cassettes. It also reduces material use and cost.

In a further embodiment, the main guide rail pillar extends through a second opening in the second mold plate and further, the second opening in the second mold plate is formed centrally in the second mold plate. Alternatively, the single main guide rail pillar extends through a second opening in the second mold plate, where said opening in the second mold plate is formed centrally adjacent to a lower edge of the second mold plate.

In a further embodiment, the main guide rail pillar may be anchored in a first opening through the first mold plate. In a further embodiment thereof, the main guide rail pillar at a first end thereof is provided with a protrusion configured for cooperating with an enlargement of the first opening in the first mold plate.

The objects of the disclosure are achieved by an injection molding machine comprising a clamping unit according to any one of the embodiments of the first aspect of the disclosure.

More particularly, the objects of the disclosure are achieved by an injection molding machine comprising a frame;

an injection unit attached to the frame;

a clamping unit according to any one of the embodiments of the first aspect of the disclosure, the clamping unit being attached to the frame; and a linear drive mechanism for moving a second mold plate of a mold box of the clamping unit.

In either case the clamping unit and/or mold box of the injection molding machine according to the second aspect of the disclosure may comprise any of the features of the clamping unit and/or mold box according to any one of the embodiments of the first aspect of the disclosure as described above, or in the detailed description below.

A main guide rail system and any main guide rail pillars, thereof, are separate from any alignment system.

It should be emphasized that the term "comprises/comprising/comprised of" when used in this specification is taken to specify the presence of stated features, integers, steps or components but does not preclude the presence or addition of one or more other features, integers, steps, components or groups thereof.

It should be appreciated that the subject technology can be implemented and utilized in numerous ways, including without limitation as a process, an apparatus, a system, a device, a method for applications now known and later developed. These and other unique features of the system disclosed herein will become more readily apparent from the following description and the accompanying drawings.

BRIEF DESCRIPTION OF THE DRAWINGS

In the following, the disclosure will be described in greater detail with reference to embodiments shown by the enclosed figures. It should be emphasized that the embodiments shown are used for example purposes only and should not be used to limit the scope of the disclosure.

FIG. 3B, in a front view, shows the mold box of FIG. 3A.

FIG. 3C, in a sectional side view, shows the mold box of FIGS. 3A and 3B.

FIG. 4A, in a perspective view, shows the mold box of FIGS. 3A-C in a second position.

FIG. 4B, in a front view, shows the mold box of FIG. 4A.

FIG. 4C, in a sectional side view, shows he mold box of FIGS. 4A and 4B.

FIG. 5, in an exploded perspective view, shows the mold box of FIGS. 3A-C and 4A-C.

DETAILED DESCRIPTION

Figure 1:
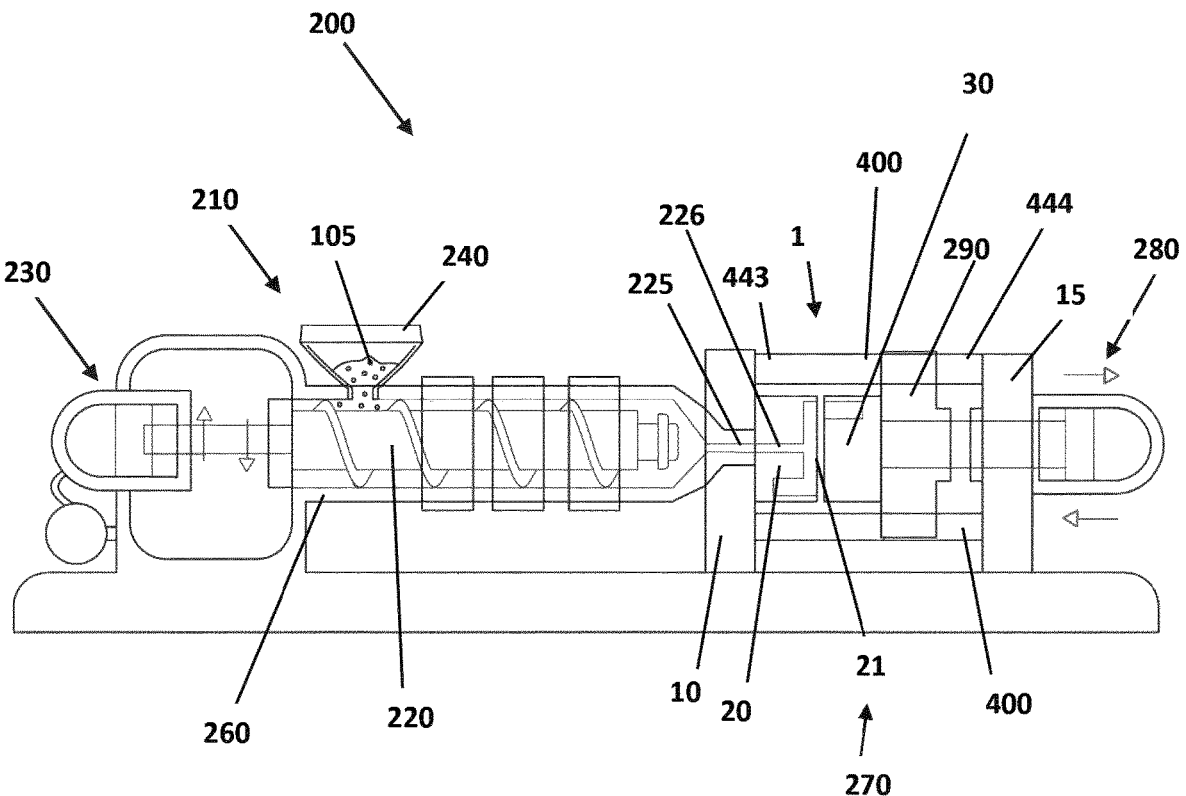
FIG. 1 schematically shows an outline of a prior art injection molding machine.

The subject technology overcomes many of the prior art problems associated with linear guide rails. The advantages, and other features of the technology disclosed herein, will become more readily apparent to those having ordinary skill in the art from the following detailed description of certain preferred embodiments taken in conjunction with the drawings which set forth representative embodiments of the present technology and wherein like reference numerals identify similar structural elements. Directional indications such as upward, downward, right, left and the like are used with respect to the figures and not meant in a limiting manner.

FIG. 1 illustrates schematically an injection molding machine 200 as known in the art. The injection molding machine 200 generally comprises an injection unit 210, shown in the left side of the figure, and a clamping unit 270, shown in the right side of the figure. The injection unit 210 handles injection of plastic material into a mold formed in the clamping unit 270 of the injection molding machine 200. The injection unit 210 and the clamping unit 270 of the injection molding machine 200 are attachable to a mount 201.

Injection molding machines 200 generally works in the following way: Plastic granules 105 are fed into the barrel 260 of a reciprocating screw 220 of the injection unit 210 via a hopper 240. The reciprocating screw 220 is driven by a drive mechanism 230, such as an electrical motor. The plastic granules 105 fed through the hopper 240 are then transported towards the clamping unit 270 by the reciprocal screw, while being compacted and they are heated by heating devices 250 surrounding the reciprocating screw 220, until they melt and reach a suitable viscosity at a nozzle 225 at the entrance to the clamping unit 270 with the mold. The mold is formed in a mold box 1.

The fluid plastic material is fed from the nozzle 225 through sprue channels 226 in a base plate 10 of the mold box 1, and reaches a mold cavity 21 formed in a first mold plate 20 of the mold box 1. The first mold plate 20 of the mold box 1 is connected to the base plate 10. The base plate 10 is connected to the mount 201. A second mold plate 30 which may comprise a mold core and/or further portions of a mold cavity is arranged moveably relative to the first mold plate 20, such that the mold box may be completely closed (clamped together) to allow injection of the melted plastic, and such that the mold box 1 may be opened to extracted a molded object 100 (see FIG. 2).

In FIG. 1, the second mold plate 30 is attached to a moveable platen 290. The moveable platen 290—and thereby the second mold plate 30—is slideabiy arranged on a set of cylindrical main guide rail pillars 400. Typically, the clamping unit 270 of injection molding machines 200 comprises four cylindrical main guide rail pillars 400 for guiding the movement of the moveable platen 290 with the second mold plate 30. The movement of the moveable platen 290 with the second mold plate 30 is performed by a linear drive mechanism 280, typically a hydraulic mechanism.

Still referring to FIG. 1, each of the main guide rail pillars 400 of the main guide rail system of the mold box 1 of the clamping unit 270 has an elongate body, which is cylindrical, and has a first end 443 and a second end 444. The first end 443 is fixed to the base plate 10, which is fixed to a frame (not shown) of the clamping unit 270. The frame of the clamping unit 270 may form part of the frame 201 of the injection molding machine 200, or may be fixed thereto.

The opposite end, the second end 444, of the elongate body of each main guide rail pillars 400 is fixedly connected to a second end structure 15 of the clamping unit 270. The second end structure 15 of the clamping unit 270 is fixed to the frame (not shown) of the clamping unit 270, which, as mentioned in the previous paragraph, may form part of the frame 201 of the injection molding machine 200, or may be fixed thereto.

The second end structure 15 may also, as shown in FIG. 1, form a mount for the linear drive mechanism 280.

Now, returning to the moveable platen 290 with the second mold plate 30 of FIG. 1, this moveable platen 290 comprises through-going bearing e.g. slide bearings or ball bearings, slidably receiving the cylindrical main guide rail pillars 400.

In an injection process, the linear drive mechanism 280 clamps the first mold plate 20 and the second mold plate 30 together, whereupon plastic is injected from the reciprocal screw 220 through the nozzle 225 and into the mold cavity 21. When the plastic has filled the mold cavity 21 completely, and has cooled sufficiently for the plastic to be in solid state, then the linear drive mechanism 280 moves the second mold plate 30 away from the first mold plate 20, and the molded object 100 is ejected from the mold cavity 21 in the first mold plate 20, The ejection of the molded object 100 is typically done by ejector pins (not shown) formed in/through the base plate 10.

Figure 2:
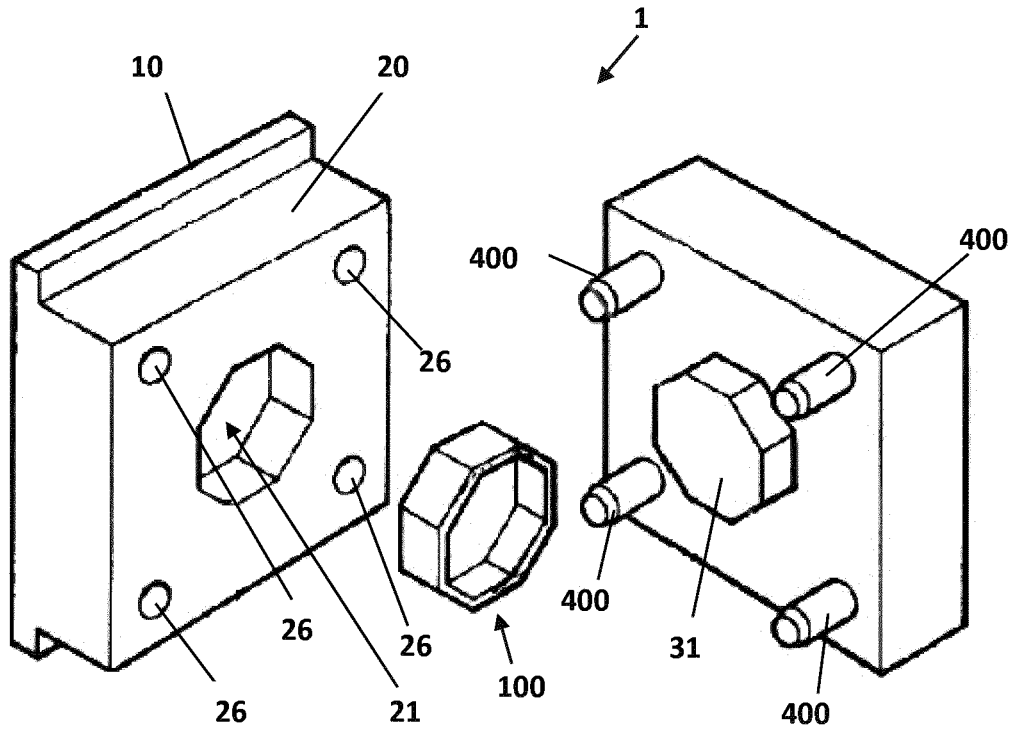
FIG. 2, in a perspective view, shows components of a prior art mold box with two half-plates (mold plates) and a set of cylindrical main guide rail pillars.

FIG. 2 shows a prior art mold box 1 for an injection molding machine 200 (as outlined in FIG. 1), and a molded object 100. The mold box 1 is shown in a separated state where the molded object 100 is visible between two half plates, or mold plates 20, 30 of the mold box 1. Thus, the mold box 1 comprises two mold plates 20, 30. A first mold plate 20, here shown to comprise a mold cavity 21 of a mold, is fixedly connected to a base plate 10 of the mold box 1. The first mold plate 20 and the base plate 10 may form one integrated part, or they may be formed as separate parts and joined subsequently by suitable means, e.g. bolts. A mold cavity 21 is formed as a depression in a surface of the first mold plate 20.

The first mold plate 20 is—via the base plate 10—connected to an injection molding machine 200, e.g. as described above. The base plate 10 may thus be connected to a mount or frame 201, as shown in FIG. 1.

A second mold plate 30 is moveably arranged relative to the first mold plate 20 and the injection molding machine 200. The second mold plate 30 is slideably arranged on a set of main guide rail pillars 400 of a main guide rail system configured for guiding the second mold plate 30 linearly away from and towards the first mold plate 20.

The set of main guide rail pillars 400 comprises four cylindrical guide rails 400. The guide rails 400 are arranged to slide over bearings (not shown) provided through the second mold plate 30. In FIG. 2 only a portion of each main guide rail pillar 400 is seen.

The main guide rail pillars 400 may fixedly secured in the openings 26 provided in the first mold plate 20. There is one opening 26 per main guide rail pillar 400.

In FIG. 2 the main guide rail pillars 400 extend through the second mold plate 30 itself, as opposed to the version shown in FIG. 1, where the second mold plate 30 is connected to a moveable platen 290, which has bearings for the main guide rail pillars 400.

In FIG. 2 the second mold plate 30 is shown with a core 31 configured for mating with the mold cavity 21 in the first mold plate 20 to form a shape corresponding to the molded object 100.

It will be appreciated that the drawings, FIGS. 1-2, represent simple versions of a mold with mold plates 20, 30. Thus, in other versions, for example, the core 31 and cavity 21 may be formed in cassettes insertable or attachable into the mold plates 20, 30 or to insert Mocks attached to the mold plates. It will also be appreciated that the mold plates may comprise plurality of cooperating cores and cavities. It will further be appreciated that some or all the cores and the cavities may be reversed between the mold plates. It will also be appreciated that the first mold plate 20 may not be fixed to the base plate 10, but may be movable relative thereto. It will further be appreciated that mold boxes may comprise further mold plates. These considerations apply to prior art mold boxes, as well as to the mold boxes and clamping units according to the various embodiments of the disclosure described below.

FIGS. 3-7 show embodiments of a mold box 1 for a clamping unit 270 for an injection molding machine 200, according to the disclosure.

The mold box 1 may be used with a clamping unit 270 for an injection molding machine 200 as described above, the mold box 1, the clamping unit 270, and the injection molding machine 200, differing in the arrangement of the main guide rail system 40'.

The mold box 1 comprises a base plate 10 and a first mold plate 20 connected thereto. During use in injection molding processes, the first mold plate 20 is fixed in position relative to the base plate 10. The base plate 10 is fixedly connectable (immovable) to a frame of the clamping unit 270, which—as also mentioned above may be a frame 201 of the injection molding machine 200, form part of the frame of the injection molding machine 200 or be immovably connected to the frame 201 of the injection molding machine 200, such as the injection molding machine, e.g. as described in connection with the prior art injection molding machine 200 shown in FIG. 1. The first mold plate 20 may comprise one or more mold cavities (not shown) formed as depressions in a first surface 22 of the first mold plate 20. An opposite side, second side 23 of the first mold plate 20 faces the base plate 10, see e.g. FIG. 5.

The first mold plate 20 may be formed integrally with the base plate 10, or it may—as shown in FIGS. 3-5—be formed as individual/separate parts and subsequently be joined/connected, such that the first mold plate 20 is fixed to the base plate 10 at least during the injection molding process. The first mold plate 20 may be connected to the base plate 10 using for example bolts.

The one or more mold cavities 21 (not distinctly shown) may be formed in one or more cassettes attachable on, or insertable in suitable recesses in, the first surface 22 of the first mold plate 20, such as insertable in mold blocks (not shown) formed on and extending from the first side 22 of the first mold plate 20. Such mold blocks are shown in e.g. WO 2007/063375 A1.

Further, the first mold plate 20 and/or the base plate 10 may be equipped with sprue channels and runner channels necessary to connect the one or more mold cavities in the first mold plate 20 with an injection nozzle 225 of an injection molding machine 200, such as an injection molding machine as shown in FIG. 1. Such sprue channels and runner channels are not shown in FIGS. 3-7.

The mold box 1 according to the disclosure—and as shown in FIGS. 3-5—further comprises a second mold plate 30.

The second mold plate 30 is movably arranged relative to the first mold plate 20. Thereby, the second mold plate 30 is also movably arranged relative to the base plate 10.

The mold box 1 according to the disclosure as shown in FIGS. 3-5—further comprises a main guide rail system 40' configured for guiding the second mold pl linearly away from and towards the first mold plate 20.

The main guide rail system 40' allows at least the second mold plate 30 to be movably arranged relative to the base plate 10. The second mold plate 30 is movable on the main guide rail system 40' by a linear drive mechanism 280 as shown in FIG. 1. Such a linear drive mechanism 280 is most commonly hydraulic or electrical.

In other embodiments, the first mold plate 20 may also be movably arranged, relative to the base plate 10, the clamping unit 270 of the injection molding machine 200 further comprising means for moving the first base plate 20 on the main guide rail system 40'.

In yet another embodiment, the mold box 1 may comprise a third plate, or even further plates (not shown) arranged between the first and second mold plates 20, 30, where for example runner channels are arranged in third plate. Such a third plate may be fixed relative to the base plate 10 or it may be moveable on the main guide rail system 40' in order to facilitate de-shaping of the runner channels.

Figure 7:
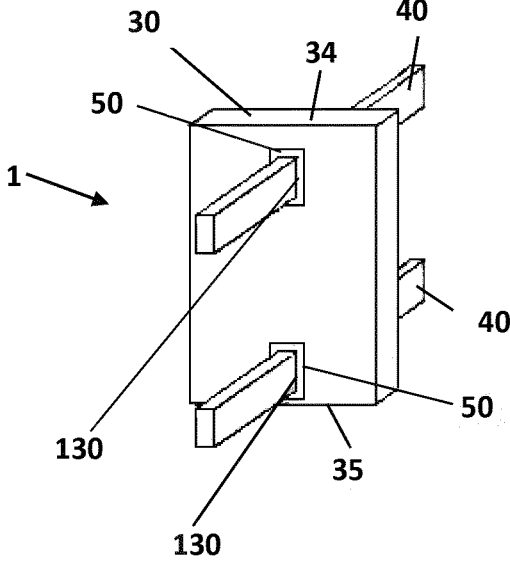
FIG. 7, in a perspective view, shows an alternative mold box disclosure.

As shown in FIGS. 3-5, the main guide rail system 40' comprises a single main guide rail pillar 40. That means on and only one main guide rail pillar 40. In principle, the main guide rail system may 40' may comprise more than a single main guide rail pillar, but only one is needed. FIG. 7 illustrates an example, where the mold box comprises two main guide rail pillars, a first main guide rail pillar 40 and a second main guide pillar 40. The first main guide rail pillar 40 extends through an opening 130 formed through the second mold plate 30. This opening 130 through the second mold plate 30 is formed adjacent to an upper edge 34 of the second mold plate 30, and centrally along this edge 34. Further, the second main guide rail pillar 40 extends through another opening 130 in the second mold plate 30. This is formed adjacent to a lower edge 35 of the second mold plate 30, and centrally along this edge 35.

The main guide rail pillar 40 is elongate, having a first end 43 and second end 44, an elongate body part 41 extending between the first end 43 and the second end 44, and a longitudinal axis A. The main guide rail pillar 40 has a cross sectional shape perpendicular to the longitudinal axis A.

The cross-section/cross-sectional shape forms a polygon.

We note that by a polygon or polygonal shape we mean any 2-dimensional shape formed with straight lines. Triangles, quadrilaterals, pentagons, and hexagons are all examples of polygons.

There are two main types of polygon—regular and irregular. A regular polygon has equal length sides with equal angles between each side. Any other polygon is an irregular polygon, which by definition has unequal length sides and unequal angles between sides. In principle, the cross-section of the main guide pillar according to the disclosure may have any polygonal shape.

However, as shown in FIGS. 3-7, the polygonal shape may in some embodiments be rectangular.

In some embodiments a longer side length of the rectangular cross sect on/cross-sectional shape may be arranged vertically. Thus, the rectangular shape of the main guide rail pillar 40 is oriented such that a longer side of the rectangular shape extends vertically and a shorter side of the rectangular shape extends horizontally In any case, each main guide rail pillar 40 having a cross-section/cross-sectional shape forming a polygon will result in the main guide rail pillar 40 having a set of planar guide surfaces 45', 45", 46', 46" for cooperating with a bearing element 50 arranged on the second mold plate 30. The number of planar guide surfaces on the main guide rail pillar 40 will depend on the number of sides of the polygonal cross-section/cross-sectional shape of the main guide rail pillar 40. The main guide rail pillar 40 shown in FIGS. 3-5 having a rectangular cross section has two wider planar guide surfaces 45', 45", and two narrower planar guide surfaces 46', 46". The two wider planar guide surfaces 45', 45" are parallel to each other and formed on opposed sides of the main guide rail pillar 40. Similarly, the two narrower planar guide surfaces 46', 46" are parallel to each other and formed on opposed sides of the main guide rail pillar 40, but perpendicular to the two wider planar guide surfaces 45', 45".

The second mold plate 30 may comprise one or more mold cores (not distinctly shown) extending outward from a first surface 32 of the second mold plate 20, facing the first surface of the first mold plate 20. An opposite side, second surface 33 of the second mold plate 320 faces away from the first mold plate 20 and the base plate 10, see e.g. FIG. 5. The second mold plate 30 is arranged moveably relative to the first mold plate 20, such that the mold box may be completely closed (clamped together) to allow injection of the melted plastic, and such that the mold box 1 may be opened to extracted a molded object, e.g. similar to the molded object 100 shown in FIG. 2.

The one or more (not shown) mold cores 31 may—in also not shown—further embodiments be farmed in one or more cassettes attachable on—or insertable in suitable recesses in—the first surface 32 of the second mold plate 30, such as insertable in mold blocks (not shown) formed on and extending from the first side 32 of the second mold plate 30, Such mold blocks are shown in e.g. WO 2007/063375 A1.

As is the case with the first mold plate 20, described above, the one or more mold cores 31 (not distinctly shown in FIGS. 3-7) (and/or further portions of mold cavities) may, in also not distinctly shown, further embodiments be formed in one or more cassettes, which cassettes are attachable on—or insertable in suitable recesses in—the first surface 32 of the second mold plate 30.

As is the case with the prior art examples described above, the mold box 1 according to the disclosure may form part of a clamping part 270 of an injection molding machine 200, in this case however with a single polygonal cross-section main guide rail pillar 40 (instead of the four cylindrical main guide rails 400, shown in FIG. 1) for guiding the movement of the second mold plate 30. The movement of the second mold plate 30 is performed by a linear drive mechanism 280, for example a hydraulic mechanism.

As shown in FIGS. 3-5 and 6, the main guide rail pillar 40 extends through a second opening 130 in the second mold plate 30. The first opening 130 in the second mold plate 30 is a through-going opening extending all the way through the second mold plate 30.

The second opening 130 in the second mold plate 30 preferably has a cross sectional shape corresponding to the cross-sectional shape of the main guide pillar 40 such that the main guide rail pillar 40 may be slidably arranged therein.

Preferably, the second opening 130 in second mold plate 30 is provided with a bearing element 50, such as to provide a slide bearing between the second mold plate 30 and the main guide rail pillar. In this case the second opening 130 in the second mold plate 30 is configured to receive the bearing element 50.

The bearing comprises a bearing element 51 with inner surfaces configured for contacting the planar surfaces of the main guide rail pillar 40. The bearing element 50 may, as shown in FIG. 5, have a main body part 51 and flange 52, which flange has a larger cross sectional extent than that of the main body part 51. In such cases the second opening 130 in the second mold plate 30 may comprise one first section 131 configured for receiving the main body part 51 of the bearing element 50, and another, second section 132 with a larger cross-sectional extend than the first section 131, and configured for receiving the flange 52 of the bearing element 50, see e.g. FIG. 4C.

As shown in FIGS. 3-5 and 6, the main guide rail pillar 40 extends through an opening formed through the bearing element 50, a third opening 150. The third opening 150 in the bearing element 50 is a through-going opening extending all the way through the bearing 50. The third opening 150, i.e. the opening through the bearing 50 preferably has a cross sectional shape corresponding to the cross-sectional shape of the main guide pillar 40 such that the main guide pillar 40 may be may be slidably arranged therein.

As shown in FIGS. 3-5 and 6, the main guide rail pillar 40 also may extend through a first opening 120 in the first mold plate 20. The first opening 120 in the first mold plate 20 is a through-going opening extending all the way through the first mold plate 20. The first opening 120 in the first mold plate 20 preferably has a cross sectional shape corresponding to the cross-sectional shape of the main guide pillar 40 such that the main guide pillar 40 may be received and fixedly anchored.

The main guide rail pillar 40 may have a main body part 41 and flange or protrusion 42 having a larger cross sectional extent than that of the main body part 41, see e.g. FIG. 5. In such cases, and as shown in e.g. FIG. 4C, the first opening 120 in the first mold plate 20 may comprise one first section 121 configured for receiving the main body part 41 of the main guide rail pillar 40, and another, second section 122 with a larger cross-sectional extend than the first section 121, and configured for receiving the flange 42 of the main guide rail pillar 40, see e.g. FIG. 4C. 6. The main guide rail pillar, 40 at a first end 43 thereof, may thereby be provided with a protrusion 41 configured for cooperating with an enlargement 121 of the second opening 120 in the first mold plate 20.

Thus, the main guide rail pillar 40 is anchored in first opening 120, i.e. the opening formed through the first mold plate 20.

In either case, and as shown in FIGS. 3-5 the second opening 130 in the second mold plate 30 is formed centrally in the second mold plate 30. In this case, it follows that the first opening 130 in the first mold plate 30 is also formed centrally in the second mold plate 30.

Figure 6:
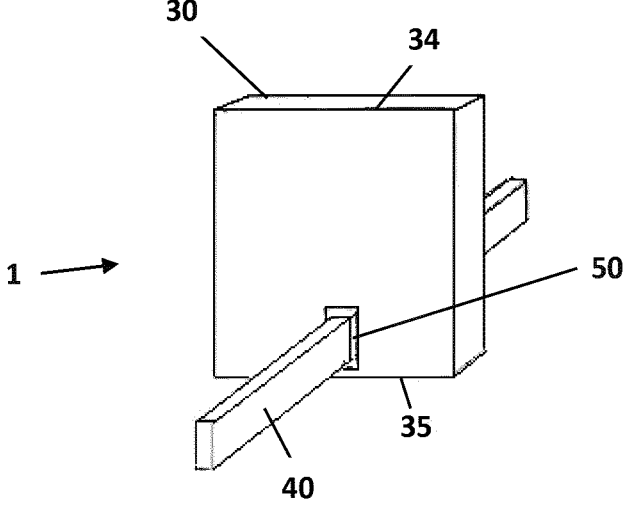
FIG. 6, in a perspective view, shows a mold box according to another embodiment of the disclosure.

In other embodiments, and as illustrated in FIG. 6, a single main guide rail pillar may not necessarily have to be arranged through a centrally located opening 130. FIG. 6 shows an embodiment, where a single main guide rail pillar 40 is arranged through an opening 130 (with a bearing element 50, e.g., as mentioned above), which is located adjacent to a lower edge 35 of the second mold plate 30, and centrally on the lower edge 35.

The one or more mold cavities 21 may be formed around the first opening 130 in the first mold plate 20. Further, mating mold cores 31 may be formed around the second opening in the movable, second mold plate 30.

Figure 3A:
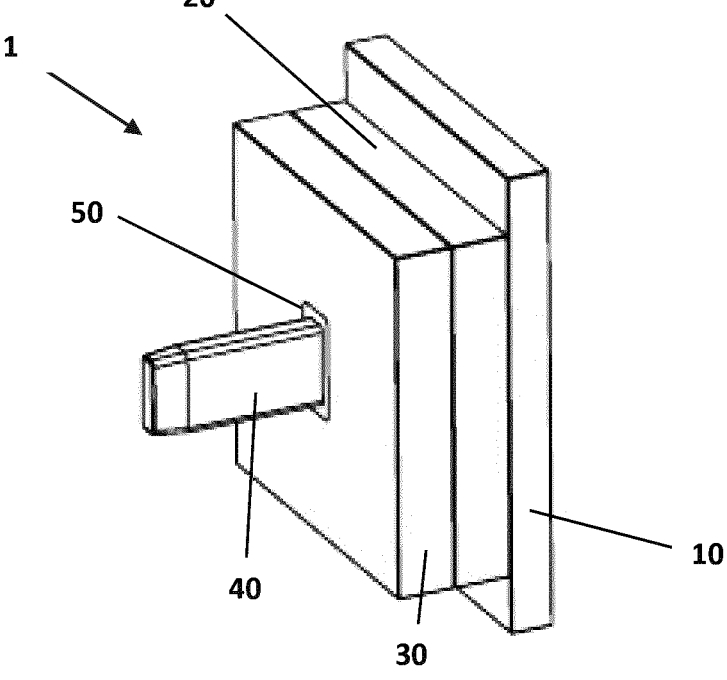
FIG. 3A, in a perspective view, shows a mold box according to one embodiment of the disclosure in a first position.

FIGS. 3A-C, in various views, show a mold box 1 according to one embodiment of the disclosure, in a first position or stage, where the first and second mold plates 20, 30 are in close contact and clamped together. This illustrates a position, where melted plastic may be injected into the (not shown) mold cavity formed between the first and second mold plates 20, 30. Correspondingly, FIGS. 4A-C show the mold box of FIGS. 3A-C in a second position, where the first and second mold plates 20, 30 are separated from each other. This illustrates a position, where molded objects 100 may be removed from the mold cavity.

It is to be noted that the figures and the above description have shown the example embodiments in a simple and schematic manner. Many of the specific mechanical details have not been shown since the person skilled in the art should be familiar with these details and they would just unnecessarily complicate this description.

LIST OF PARTS 1 mold box
10 base plate
15 second end structure of the clamping part/clamping unit
20 first mold plate
21 mold cavity
24 upper edge of the second mold plate
25 lower edge of the second mold plate
22 first surface of the first mold plate
23 second side of the first mold plate, opposite to first side
24 upper edge of the first mold plate
25 lower edge of the first mold plate
26 openings provided in the first mold plate (prior art)
30 second mold plate
31 mold core
32 first surface of the second mold plate
33 second side of the second mold plate, opposite to first side
34 upper edge of the second mold plate
35 lower edge of the second mold plate
40' main guide rail system
40 main guide rail pillar, first main guide rail pillar, second main guide rail pillar
41 elongate body part of the main guide rail pillar
42 protrusion at end of the elongate body part of the main guide rail pillar
43 first end of the elongate body part of the main guide rail pillar
44 second end of the elongate body part of the main guide rail pillar
45' surface of main guide rail pillar
45" surface of main guide rail pillar
46' surface of main guide rail pillar
46" surface of main guide rail pillar
50 bearing/bearing element
51 bearing element
51 main body part of the bearing element
52 flange of the bearing element
100 molded object
105 plastic granules
120 opening through the first mold plate, first opening
121 enlargement of the first opening, i.e.
130 opening formed through the second mold plate, second opening
131 first section of the second opening, the opening formed through the second mold plate
132 second section of the second opening, the opening formed through the second mold plate
150 opening through bearing element, third opening
200 injection molding machine
201 frame/mount of the injection molding machine
210 injection part/injection unit
220 reciprocating screw arrange in barrel of injection part of injection molding machine
225 nozzle for injecting melted plastic into the mold box
226 sprue channels 226 in a base plate
230 drive mechanism for reciprocating screw, such as an electrical motor
240 hopper, for feeding plastic granules in barrel of injection part of injection molding machine
260 barrel
250 heating devices 270 clamping part'clamping unit
280 linear drive mechanism
290 moveable platen
400 cylindrical main guide rails
A longitudinal axis of main guide rail pillar

What is claimed is:

1. An injection molding machine comprising:
a frame;
a clamping unit being attached to the frame; and
a linear drive mechanism,
wherein:
the clamping unit comprises:
    a clamping unit frame;
    a base plate fixedly arranged at a first end of the clamping unit frame;
    a second end structure fixedly arranged at a second end of the clamping unit frame; and
    a mold box,
the mold box comprises:
    a first mold plate;
    said second mold plate movably arranged relative to the first mold plate along a longitudinal axis; and
    a main guide rail system configured for guiding the second mold plate linearly away from and towards the first mold plate when moved by the linear drive mechanism of the clamping unit,
the main guide rail system comprises:
    only one main guide rail pillar including:
        a first end;
        a second end, the first end of the main guide rail pillar being fixedly connected to the base plate of the clamping unit, and the second end of the main guide rail pillar, being fixedly connected to the second end structure of the clamping unit; and
        a cross section perpendicular to the longitudinal axis, the cross-section forming a polygon.

2. The injection molding machine according to claim 1, wherein the cross-section of the main guide rail pillar is rectangular.

3. The injection molding machine according to claim 2, wherein the rectangular shape cross-section of the main guide rail pillar is oriented such that a longer side of the rectangular shape extends vertically and a shorter side of the rectangular shape extends horizontally.

4. The injection molding machine according to claim 1, wherein the single main guide rail pillar extends through a second opening in the second mold plate and where said opening in the second mold plate is formed centrally in the second mold plate.

5. The injection molding machine according to claim 1, wherein the single main guide rail pillar extends through a second opening in the second mold plate and where said opening in the second mold plate is formed centrally adjacent to a lower edge of the second mold plate.

6. The injection molding machine according to claim 1, wherein the single guide rail pillar traverses through a first opening of the first mold plate.

7. The injection molding machine according to claim 1, wherein a first end of the main guide rail pillar defines a protrusion configured for cooperating with an enlargement of the first opening in the first mold plate.

8. An injection molding machine comprising:
a frame;
a clamping unit mounted to the frame;
a linear drive mechanism;
a first mold plate fixed relative to the clamping unit;

a second mold plate arranged for linear movement relative to the first mold plate along a mold opening axis; and an elongate guide structure extending parallel to the mold opening axis and fixed at opposite ends to the clamping unit, the elongate guide structure supporting the second mold plate during movement by the linear drive mechanism and defining planar guide surfaces that inhibit rotational movement of the second mold plate about the mold opening axis.

9. The injection molding machine of claim 8, wherein the elongate guide structure has a polygonal cross-section perpendicular to the mold opening axis.

10. The injection molding machine of claim 9, wherein the polygonal cross-section is rectangular.

11. The injection molding machine of claim 10, wherein the rectangular cross-section includes a longer side oriented vertically and a shorter side oriented horizontally.

12. The injection molding machine of claim 8, wherein the elongate guide structure extends through an opening formed through the second mold plate.

13. The injection molding machine of claim 12, wherein the opening is formed centrally in the second mold plate.

14. The injection molding machine of claim 12, wherein the opening is formed adjacent to a lower edge of the second mold plate.

15. The injection molding machine of claim 8, further comprising a bearing element disposed between the elongate guide structure and the second mold plate, the bearing element including internal surfaces complementary to the planar guide surfaces.

16. An injection molding machine comprising:

a frame;

a clamping assembly secured to the frame;

a base plate fixed relative to the clamping assembly;

a first mold plate fixed relative to the base plate;

a second mold plate movable relative to the first mold plate;

a linear actuator configured to move the second mold plate; and a single guide pillar extending between a base-side structure and an opposing end structure of the clamping assembly, the second mold plate being slidably mounted on the single guide pillar by a bearing arrangement that constrains rotational movement of the second mold plate during linear travel.

17. The injection molding machine of claim 16, wherein the guide pillar has a polygonal cross-section defining opposed planar surfaces.

18. The injection molding machine of claim 17, wherein the polygonal cross-section is rectangular.

19. The injection molding machine of claim 16, wherein the bearing arrangement is received within a through-opening of the second mold plate.

20. The injection molding machine of claim 16, wherein the single guide pillar provides the sole structural guidance of the second mold plate relative to the first mold plate.

* * * * *